(12) United States Patent
Liang et al.

(10) Patent No.: US 12,498,132 B2
(45) Date of Patent: Dec. 16, 2025

(54) HUMIDIFIER AND HOUSEHOLD APPLIANCE

(71) Applicant: GD MIDEA ENVIRONMENT APPLIANCES MFG CO., LTD., Zhongshan (CN)

(72) Inventors: Yinan Liang, Zhongshan (CN); Shiqiang Cui, Zhongshan (CN); Xiangwu Zhang, Zhongshan (CN)

(73) Assignee: GD MIDEA ENVIRONMENT APPLIANCES MFG CO., LTD., Zhongshan (CN)

( * ) Notice: Subject to any disclaimer, the term of this patent is extended or adjusted under 35 U.S.C. 154(b) by 351 days.

(21) Appl. No.: 18/344,804

(22) Filed: Jun. 29, 2023

(65) Prior Publication Data

US 2024/0011657 A1    Jan. 11, 2024

(30) Foreign Application Priority Data

Jul. 5, 2022   (CN) .......................... 202221717668.4

(51) Int. Cl.
| | |
|---|---|
| *F24F 11/61* | (2018.01) |
| *B01F 23/21* | (2022.01) |
| *F24F 6/00* | (2006.01) |
| *F24F 6/04* | (2006.01) |
| *F24F 8/50* | (2021.01) |
| *F24F 11/89* | (2018.01) |
| *F24F 13/20* | (2006.01) |

(52) U.S. Cl.
CPC ............ *F24F 11/61* (2018.01); *B01F 23/215* (2022.01); *F24F 6/00* (2013.01); *F24F 6/043* (2013.01); *F24F 8/50* (2021.01); *F24F 11/89* (2018.01); *F24F 13/20* (2013.01); *F24F 2006/008* (2013.01)

(58) Field of Classification Search
CPC ...... B01F 23/215; F24F 6/00; F24F 2006/008
See application file for complete search history.

(56) References Cited

FOREIGN PATENT DOCUMENTS

| | | | |
|---|---|---|---|
| JP | H07328367 A | * | 12/1995 |
| JP | 2000074470 A | * | 3/2000 |
| JP | 2011080734 A | * | 4/2011 |

\* cited by examiner

*Primary Examiner* — Robert A Hopkins
(74) *Attorney, Agent, or Firm* — K&L Gates LLP (57) ABSTRACT

Disclosed are a humidifier and a household appliance. The humidifier includes a housing, a fan, a water absorption net assembly and a time record assembly. The housing is provided with an air inlet and an air outlet, an air duct communicating with the air inlet and the air outlet, and a water storage tank communicating with the air duct are formed inside the housing. The fan is provided in the air duct. The water absorption net assembly is at least partially extending into the water storage tank and at least partially extending into the air duct. The time record assembly is installed in the housing and configured to record a use time of the water absorption net assembly.

15 Claims, 4 Drawing Sheets

HUMIDIFIER AND HOUSEHOLD APPLIANCE

CROSS-REFERENCES TO RELATED APPLICATIONS

This present application claims priority to Chinese Patent Application No. 202221717668.4, filed on Jul. 5, 2022, the entire contents of which are incorporated herein by reference.

FIELD

The present application relates to the technical field of electrical appliances, in particular to a humidifier and a household appliance.

BACKGROUND

With the improvement of people's living standards, the requirements for indoor air comfort are getting higher and higher. Not only is the indoor air temperature required to be within a comfortable range, but also the humidity is required to be within a comfortable range. Existing household air conditioners and central heating can only regulate the temperature of the indoor air, but cannot regulate the humidity of the air. The human body still feels uncomfortable, and symptoms such as nosebleeds appear. In order to further improve comfort, various technologies for humidifying the air have emerged. Humidification technology involves humidifying the air by absorbing water through the water absorption net assembly. However, in the related art, it is impossible to record the use time of the water absorption net assembly, so that the user cannot clean or replace the water absorption net assembly in time, which will seriously affect the humidification effect of the humidifier.

SUMMARY

The main purpose of the present application is to provide a humidifier and a household appliance, aiming to solve the problem that the use time of the water absorption net assembly cannot be recorded in the related art, resulting in users being unable to clean or replace the water absorption net assembly in time, which will seriously affect the humidification effect of the humidifier.

In order to achieve the above objective, the present application provides a humidifier, including:

a housing provided with an air inlet and an air outlet, an air duct communicating with the air inlet and the air outlet, and a water storage tank communicating with the air duct are formed inside the housing;
a fan provided in the air duct;
a water absorption net assembly at least partially extending into the water storage tank and at least partially extending into the air duct; and
a time record assembly installed in the housing and configured to record a use time of the water absorption net assembly.

In an embodiment, the time record assembly includes an identification portion and an indication portion, the identification portion is provided with a scale, and a relative position between the indication portion and the identification portion is adjustable, to make the indication portion correspond to different scales on the identification portion.

In an embodiment, the identification portion is set as a dial, and the indication portion and the dial is adjustable relative to each other.

In an embodiment, the housing is provided with a first installation hole, scales are provided on an outer peripheral side of the dial, the dial is rotatably installed in the housing, and the outer peripheral side of the dial corresponds to the first installation hole; and the identification portion is provided on an outer surface of the housing and corresponds to the first installation hole.

In an embodiment, the housing is further provided with a second installation hole adjacent to the first installation hole; the housing is further provided with an installation bracket, a first end of the installation bracket is installed to correspond to the first installation hole for the dial to be rotated and installed, a second end of the installation bracket is installed to correspond to the second installation hole; the humidifier further includes a knob assembly, the knob assembly is installed at the second installation hole, and a first end of the knob assembly is rotatably installed at the second end of the installation bracket.

In an embodiment, the housing are provided with air inlets distributed along a circumference of the housing; and the air outlet is provided at a top of the housing.

In an embodiment, the water storage tank is provided at a bottom of the housing; the water absorption net assembly includes a ring-shaped water absorption net, and the water absorption net is provided inside air inlets; and the water storage tank is provided on a lower side of the water absorption net.

In an embodiment, the air duct includes an air outlet duct and an air inlet duct distributed up and down; air inlets correspond to a peripheral side of the air inlet duct; and the fan is provided in the air outlet duct, and a rotation shaft of the fan extends vertically.

In an embodiment, the housing includes: a lower housing and an upper housing, wherein the water storage tank is formed on the lower housing; and the upper housing is configured to cover an upper end of the lower housing.

In an embodiment, the fan is installed in the upper housing.

In an embodiment, a peripheral side of the upper housing is provided with air inlets, a top of the upper housing is provided with the air outlet, the air duct is formed in the upper housing, a partition plate is provided in the air duct, the partition plate is configured to divide the air duct into an air inlet duct and an air outlet duct arranged up and down, an outlet is provided on the partition plate, the air inlet duct is communicated with the water storage tank, and the fan is installed on the partition plate.

In an embodiment, an upper end of the water absorption net assembly is configured to abut against the partition plate.

In an embodiment, a water supply duct is provided inside the housing, a water inlet of the water supply duct is provided on a top of the housing, and a water outlet of the water supply duct is communicated with the water storage tank.

In an embodiment, the water supply duct is provided at an end of the water inlet in a decreasing manner from top to bottom.

In an embodiment, the humidifier further includes a micro switch for controlling the fan to open or close, wherein the micro switch is provided in the housing, a floating member is further provided in the water storage tank, and the floating member is movably installed in the water storage tank along up and down, and to trigger the micro switch during its moving stroke.

In an embodiment, the water storage tank is formed in an inner cavity at a lower end of the housing, a bottom of the water storage tank is provided with an installation seat communicating with the water storage tank, and an upper end of the installation seat is provided with an opening; and the floating member includes a floating ball and a jacking rod, the floating ball is provided in the installation seat, one end of the jacking rod passes through the opening and is connected with the floating ball, and the other end of the jacking rod is configured to abut against the micro switch.

In an embodiment, the humidifier further includes an aromatherapy assembly installed on the housing and corresponding to the air outlet.

In an embodiment, the air outlet is further provided with a guide blade.

In order to achieve the above objective, the present application provides a household appliance, including the humidifier as described above. The humidifier includes:
- a housing provided with an air inlet and an air outlet, wherein an air duct communicating with the air inlet and the air outlet, and a water storage tank communicating with the air duct are formed inside the housing;
- a fan provided in the air duct;
- a water absorption net assembly at least partially extending into the water storage tank and at least partially extending into the air duct; and
- a time record assembly installed in the housing and configured to record a use time of the water absorption net assembly.

In one embodiment of the present application, the housing is provided with an air inlet and an air outlet, an air duct communicating with the air inlet and the air outlet, and a water storage tank communicating with the air duct are formed inside the housing. The fan is located in the air duct. When the fan is working, the outside air is sucked into the air duct from the air inlet. The water absorption net assembly at least partially extends into the water storage tank, so that the water absorption net assembly absorbs the water in the water outlet tank and then soaks. The water absorption net assembly at least partially extends into the air duct, and the air entering from the air inlet is humidified after passing through the soaked water absorption net assembly. Then the humidified air is discharged from the air outlet by the fan. The use time of the water absorption net assembly is recorded by the time record assembly installed in the housing, which is convenient for users to clean or replace the water absorption net assembly in time according to the use time, and improves the humidification effect of the humidifier.

BRIEF DESCRIPTION OF THE DRAWINGS

In order to more clearly illustrate the embodiment of the present application, the following will briefly introduce the drawings that need to be used in the description of the embodiment. The accompanying drawings in the following description are only some embodiments of the present application.

The realization of the objective, functional characteristics, and advantages of the present application are further described with reference to the accompanying drawings.

DETAILED DESCRIPTION OF THE DISCLOSURE

The embodiments of the present application will be described in more detail below with reference to the accompanying drawings. It is obvious that the embodiments to be described are only some rather than all of the embodiments of the present application.

It should be noted that if there is a directional indication (such as up, down, left, right, front, rear . . . ) in the embodiments of the present application, the directional indication is only used to explain the relative positional relationship, movement, etc. of the components in a certain posture (as shown in the drawings). If the specific posture changes, the directional indication will change accordingly.

Besides, the descriptions associated with, e.g., "first" and "second," in the present application are merely for descriptive purposes, and cannot be understood as indicating or suggesting relative importance or impliedly indicating the number of the indicated embodiment. Therefore, the feature associated with "first" or "second" can expressly or impliedly include at least one such feature. In addition, the meaning of "and/or" appearing in the disclosure includes three parallel scenarios. For example, "A and/or B" includes only A, or only B, or both A and B. Furthermore, various embodiments can be combined with each other. When the combination of embodiments is contradictory or cannot be achieved, it should be considered that such a combination of embodiments does not exist, nor is it within the scope of the present application.

With the improvement of people's living standards, the requirements for indoor air comfort are getting higher and higher. Not only is the indoor air temperature required to be within a comfortable range, but also the humidity is required to be within a comfortable range. Existing household air conditioners and central heating can only regulate the temperature of the indoor air, but cannot regulate the humidity of the air. The human body still feels uncomfortable, and symptoms such as nosebleeds appear. In order to further improve comfort, various technologies for humidifying the air have emerged. Humidification technology involves humidifying the air by absorbing water through the water absorption net assembly. However, in the related art, it is impossible to record the use time of the water absorption net assembly, so that the user cannot clean or replace the water absorption net assembly in time, which will seriously affect the humidification effect of the humidifier.

In order to solve the above problem, the present application provides a humidifier. FIG. 1 to FIG. 6 are some embodiments of a humidifier 100 provided by the present application.

As shown in FIG. 1 to FIG. 4, the humidifier 100 includes a housing 1, a fan 2, a water absorption net assembly 3, and a time record assembly 4. The housing 1 is provided with an air inlet 11 and an air outlet 12. An air duct communicating with the air inlet 11 and the air outlet 12, and a water storage tank 6 communicating with the air duct 5 are formed inside the housing 1. The fan 2 is provided in the air duct 5. The water absorption net assembly 3 is at least partially extending into the water storage tank 6 and at least partially extending into the air duct 5. The time record assembly 4 is installed in the housing 1 and configured to record a use time of the water absorption net assembly 3.

In embodiments of the present application, the housing 1 is provided with the air inlet 11 and the air outlet 12, the air duct 5 communicating with the air inlet 11 and the air outlet 12, and the water storage tank 6 communicating with the air duct 5 are formed inside the housing 1. The fan 2 is located in the air duct 5. When the fan 2 is working, the outside air is sucked into the air duct 5 from the air inlet 11. The water absorption net assembly 3 at least partially extends into the water storage tank 6, so that the water absorption net assembly 3 absorbs the water in the water outlet tank and then soaks. The water absorption net assembly 3 at least partially extends into the air duct 5, and the air entering from the air inlet 11 is humidified after passing through the soaked water absorption net assembly 3. Then the humidified air is discharged from the air outlet 12 by the fan 2. The use time of the water absorption net assembly 3 is recorded by the time record assembly 4 installed in the housing 1, which is convenient for users to clean or replace the water absorption net assembly 3 in time according to the use time, and improves the humidification effect of the humidifier 100.

There are many kinds of time record assemblies 4, for example switch time recorder, and the time record assembly 4 can also be the electronic instrument etc. that have recording time function. In an embodiment of the present application, the time record assembly 4 includes an identification portion 41 and an indication portion, the identification portion 41 is provided with a scale, and a relative position between the indication portion and the identification portion 41 is adjustable, to make the indication portion correspond to different scales on the identification portion 41. When it is necessary to record the use time of the water absorption net assembly 3, the positions of the indication portion and the identification portion 41 are adjusted, and the indication portion corresponds to the scale corresponding to the time when the water absorption net assembly 3 is first used on the identification portion 41, and to record the time when the water absorption net assembly 3 is first used. After the water absorption net assembly 3 has been used for a period of time, the user can compare the current time with the recorded initial use time to determine whether to clean or replace the water absorption net assembly 3, and the structure is simple.

Further, the identification portion 41 is set as a dial, and the indication portion and the dial can be adjusted by relative rotation. By turning the dial or the indication portion, the use time of the water absorption net assembly 3 can be recorded, the structure is simple, the operation is easy, and the production cost is low.

Figure 1:
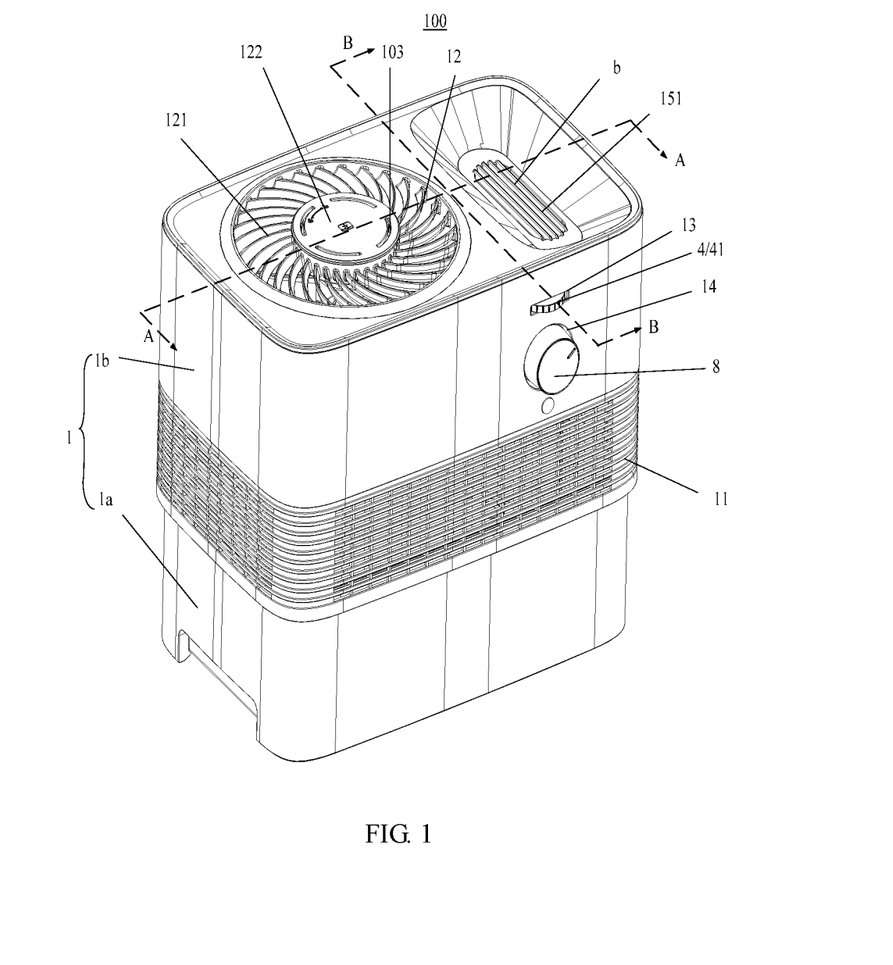
FIG. 1 is a three-dimensional schematic view of a humidifier according to an embodiment of the present application.

As shown in FIG. 1, the housing 1 is provided with a first installation hole 13, scales are provided on the outer peripheral side of the dial, the dial is rotatably installed in the housing 1, and the outer peripheral side of the dial corresponds to the first installation hole 13, and the humidifier 100 has a simple and elegant appearance. The indication portion is provided on the outer side of the housing 1 and corresponds to the first installation hole 13. The dial is toggled through the installation hole, and the scale on the outer peripheral side of the dial can correspond to the indication portion on the outer side of the housing 1, and to record the use time of the water absorption net assembly 3, and the operation is simple.

It should be noted that in other embodiments, the dial is rotatably mounted in the first installation hole 13, and the side of the dial corresponds to the first installation hole 13, so that the dial protrudes from the housing. In this way, it is convenient to turn the dial, and the operation is simple, and the present application is not limited thereto.

Figure 3:
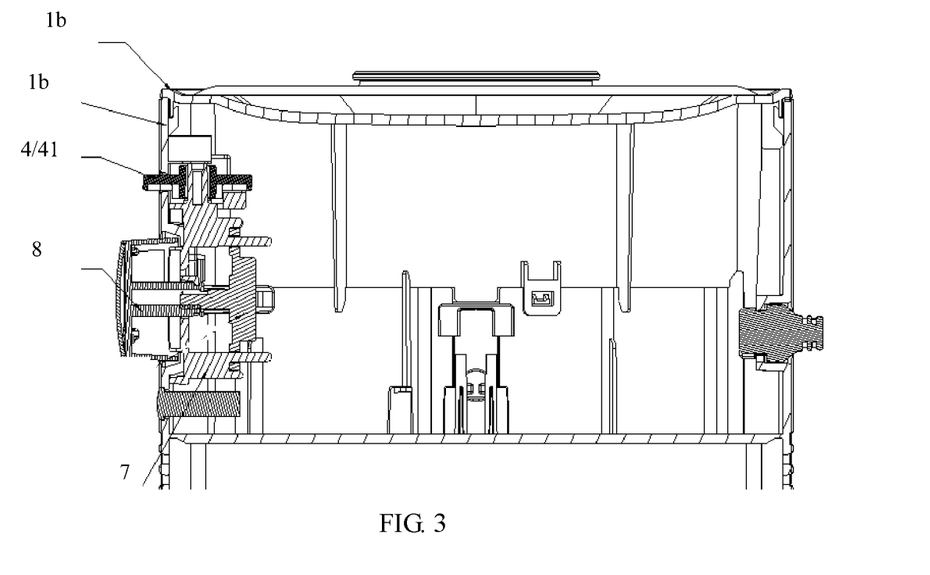
FIG. 3 is a schematic cross-sectional view of a partial structure of the humidifier in FIG. 1 along B-B.
Figure 4:
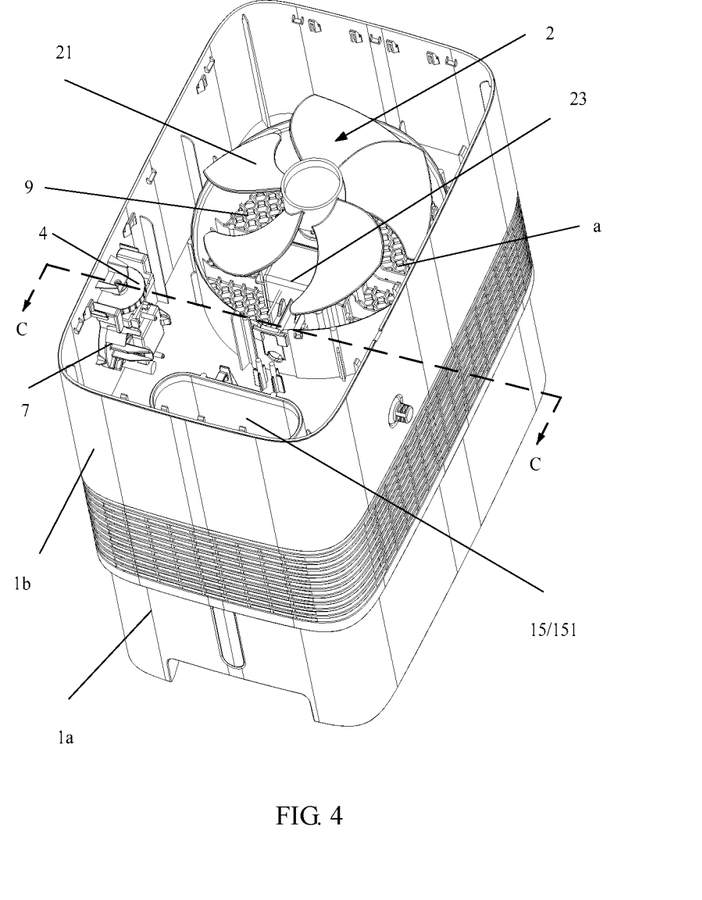
FIG. 4 is a partial structural schematic view of the humidifier in FIG. 1.
Figure 5:
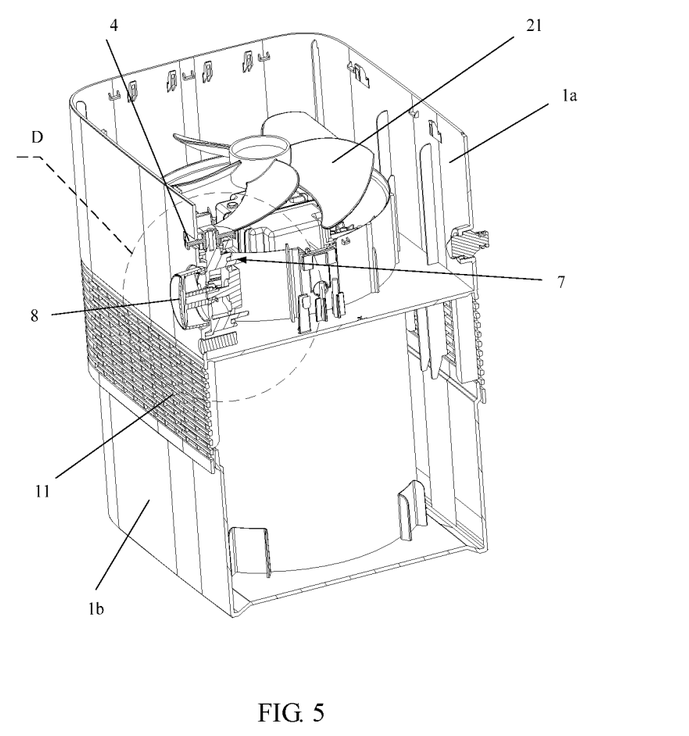
FIG. 5 is a schematic cross-sectional view along C-C in FIG. 4.

Considering that the humidifier 100 also needs to adjust the power, humidity and air speed, etc., as shown in FIG. 3 to FIG. 5, the housing 1 is also provided with a second installation hole 14 adjacent to the first installation hole 13, the housing 1 is also provided with an installation bracket 7, one end of the installation bracket 7 is installed to correspond to the first installation hole 13, and the dial is rotatably mounted on one end of the installation bracket 7, the other end of the installation bracket 7 is installed to correspond to the second installation hole 14. The humidifier 100 also includes a knob assembly 8, and the knob assembly 8 is installed at the second installation hole 14. One end of the knob assembly 8 is rotatably mounted on the other end of the installation bracket 7. Therefore, both the dial and the knob assembly 8 are mounted on the installation bracket 7, and are centrally arranged at a certain place of the housing 1, so that the adjustment is convenient. By fixing the installation bracket 7 in the housing 1, the installation efficiency of the dial and the knob assembly 8 is improved.

In order to increase the air intake, air inlets 11 are provided and distributed along the circumference of the housing 1, which not only increases the air intake, but also reduces the pressure loss. Since the air outlet 12 is provided on the top of the housing 1, the humidified air discharged from the air outlet 12 can flow in multiple directions, which improves user experience.

Figure 2:
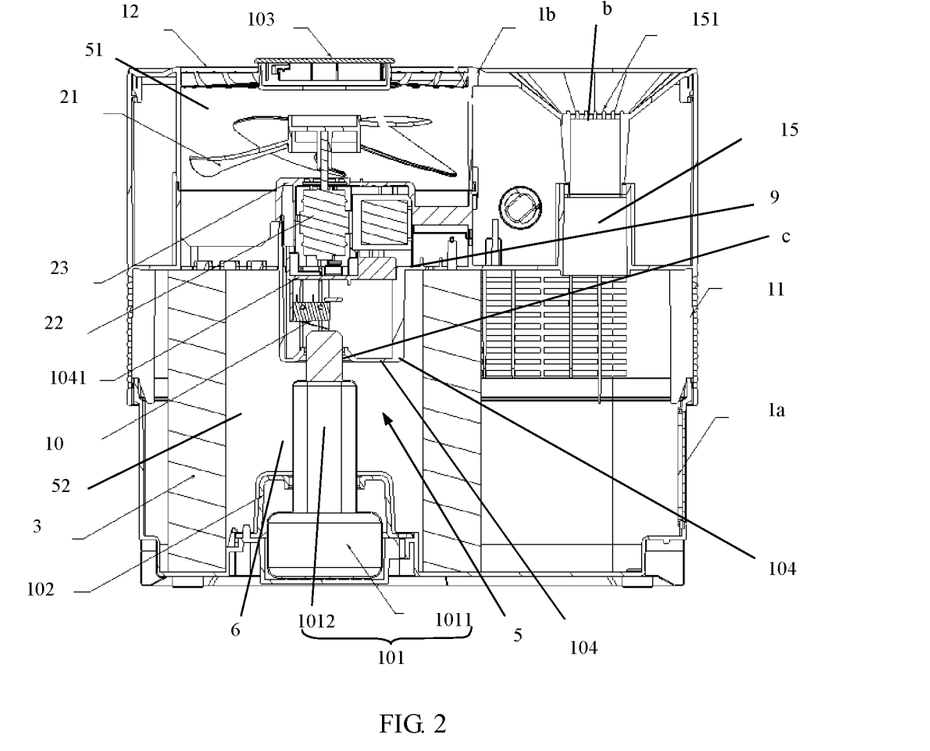
FIG. 2 is a schematic cross-sectional view of the humidifier in FIG. 1 along A-A.

As shown in FIG. 2, the water storage tank 6 is provided at the bottom of the housing 1, and the water absorption net assembly 3 includes a ring-shaped water absorption net. The water absorption net is provided inside air inlets 11. The water storage tank 6 is provided on the lower side of the water absorption net. In this way, after the water absorption net absorbs the water in the water storage tank 6 and becomes wet, the air entering from the air inlet 11 is humidified through the water absorption net, to improve the effect of humidifying the air.

In an embodiment, the air duct 5 includes an air outlet duct 51 and an air inlet duct 52 distributed up and down. Air inlets 11 correspond to a peripheral side of the air inlet duct 52, and the fan 2 is provided in the air outlet duct 51, and a rotation shaft of the fan 2 extends vertically. In this way, the air circulation rate is improved and the humidification efficiency is enhanced.

In an embodiment, the housing 1 includes a lower housing 1a and an upper housing 1b. The water storage tank 6 is formed on the lower housing 1a, so that the water storage tank 6 and the housing 1 are integrally formed, the cost is optimized, the structure is simplified, and water leakage is avoided. Since the upper housing 1b is configured to cover the upper end of the lower housing 1a, the housing 1 has a simple structure and is easy to assemble.

Further, the fan 2 is installed in the upper housing 1b, and such arrangement increases the weight of the upper housing 1b, so that the upper housing 1b and the lower housing 1a are tightly fastened.

It should be noted that, in other embodiments, the fan 2 can also be installed in the lower housing 1a, which is not limited in this application.

In order to realize the tight fastening between the upper housing 1b and the lower housing 1a, a clamping protrusion and a clamping slot adapted to the clamping protrusion are also provided between the upper housing 1b and the lower housing 1a, one of the clamping protrusion and the clamping slot is provided on the upper housing 1*b*, and the other of the clamping protrusion and the clamping slot is provided on the lower housing 1*a*. The fastening between the upper housing 1*b* and the lower housing 1*a* is realized through the cooperative installation of the clamping protrusion and the clamping slot, and the operation is simple.

In an embodiment, a peripheral side of the upper housing 1*b* is provided with air inlets 11, a top of the upper housing 1*b* is provided with the air outlet 12, the air duct 5 is formed in the upper housing 1*b*, a partition plate 9 is provided in the air duct 5, the partition plate is configured to divide the air duct 5 into an air inlet duct 525 and an air outlet duct 515 arranged up and down, an outlet a is provided on the partition plate 9, the outlet a communicates the air inlet duct 525 with the air outlet duct 515, the air inlet duct 525 is communicated with the water storage tank 6, and the fan is installed on the partition plate 9. As such, the gravity on the upper housing 1*b* is increased, so that the connection between the upper housing and the lower housing is firm, when the fan 2 is working, the fan 2 is configured to take the outside air from the air inlet 11 into the air inlet duct 52 and the air is humidified by the water absorption net assembly. The humidified air enters the air outlet duct 51 through the outlet a and is discharged through the air outlet 12, so that the humidifier 100 has a simple structure and is easy to assemble.

As shown in FIG. 2, the fan 2 includes a fan blade 21, a motor 22 and a motor shield 23. The motor shield 23 is installed on the partition plate 9, and the motor shield 23 is provided with piercing holes. The motor 22 is installed in the motor shield 23. The driving shaft of the motor 22 protrudes from the piercing hole and is drivingly connected to the fan blade 21, and a sealing structure is provided between the driving shaft and the piercing hole. As such, the fan blade 21 is driven to rotate by the motor 22 and the motor 22 is protected by the motor shield 23 to prevent the motor 22 from being in a humid environment for a long time, causing the motor 22 to be damaged.

In order to improve the effect of humidifying the inhaled air, the upper end of the water absorption net assembly 3 abuts against the partition plate, and the air entering from the air inlet 11 can enter the air outlet duct 515 and be discharged from the air outlet 12 only after being humidified by the water absorption net assembly 3, to improve the humidification efficiency of the air, and the effect is good.

Considering the need to add water, the housing 1 is also provided with a water supply duct 15, a water inlet 151 of the water supply duct 15 is located on the top of the housing 1, and a water outlet of the water supply duct 15 communicates with the water storage tank 6. Since the water inlet 151 is located on the top of the housing 1, it is convenient for the user to add water to the water supply duct 15, and the operation is simple, and when adding water, the operator can intuitively control the speed of adding water to avoid splashing.

As shown in FIG. 2, the water supply duct 15 is provided at one end of the water inlet 151 in a decreasing manner from top to bottom, and a water guide slope can be formed at the water inlet 151 to control the speed of the water-filled water flow to the water supply duct 15 and prevent water from overflowing caused by adding water too quickly.

Further, the water inlet 151 is also provided with a filter b, which is used to filter impurities, and can prevent external impurities from entering the water storage tank 6 from the water inlet 151, affecting the humidification effect of the air, and can divert the water when adding water, and to avoid water overflow caused by adding water too quickly.

In order to avoid that when there is no water or the water level is too low in the water storage tank 6, the fan runs idly. As shown in FIG. 2, the humidifier 100 also includes a micro switch 10 for controlling the housing 1 to open or close, and the micro switch 10 is provided in the housing 1. The water storage tank 6 is also provided with a floating member 101, and the floating member 101 is movably installed in the water storage tank 6 along the up and down direction, and to trigger the micro switch 10 during the movable stroke of the floating member 101. For example, when the water level in the water storage tank 6 drops to a first preset position, the floating member 101 moves downward, triggering the micro switch 10, so that the fan 2 stops rotating. When the water level in the water storage tank 6 rises to a second preset position, the floating member 101 moves upward, triggering the micro switch 10, so that the fan 2 rotates, and to automatically control the fan 2 to be closed according to the specific water level situation, which is intelligent.

In an embodiment, the water storage tank 6 is formed in an inner cavity at a lower end of the housing 1, a bottom of the water storage tank 6 is provided with an installation seat 102 communicating with the water storage tank 6, and an upper end of the installation seat 102 is provided with an opening c. The floating member 101 includes a floating ball 1011 and a jacking rod 1012, the floating ball 1011 is provided in the installation seat 102, one end of the jacking rod 1012 passes through the opening c and is connected with the floating ball 1011, and the other end of the jacking rod 1012 is configured to abut against the micro switch 10. When the water level in the water storage tank 6 drops to the first preset position, the floating ball 1011 moves downward in the installation seat 102, and the jacking rod 1012 is separated from the micro switch 10, and the fan 2 stops rotating. When the water level in the water storage tank 6 rises to the second preset position, the floating ball 1011 moves upward in the installation seat 102, the jacking rod 1012 is in conflict with the micro switch 10, so that the housing 1 rotates, and to automatically control the closing of the housing 1 according to the specific water level, which is intelligent.

Further, in order to prevent the micro switch 10 from being damaged in a humid environment for a long time, the humidifier 100 also includes a switch protective cover 104, the switch protective cover 104 is installed in the housing 1, and the switch protective cover 104 is provided with a through hole for the jacking rod 1012 to pass through. The switch protective cover 104 is provided with a bracket 1041, and the bracket 1041 is arranged corresponding to the through hole. The micro switch 10 is installed on the bracket, and the jacking rod 1012 is movably inserted in the through hole to abut or release the micro switch 10. Thus, the micro switch 10 is located in the switch protective cover 104, which separates the humid air from the micro switch 10, to improve the service life of the micro switch 10.

It should be noted that, in the above embodiments, when the fan 2 stops rotating, the user can be reminded to add water. In other embodiments, a liquid level sensor is provided on one side of the water storage tank 6, and an indicator light is installed on the housing 1, and the indicator light is used to prompt the liquid level. Or, a transmitter is installed on the housing 1, and the transmitter is configured to send the liquid level information in the water storage tank to the smart terminal. The liquid level sensor is configured to detect the water level in the water storage tank 6. The transmitter can be a WIFI module or a Bluetooth module, etc., so that the user can know the liquid level in the water storage tank 6 and to add water in time and ensure the working time of the humidifier 100. When the liquid level in the water storage tank 6 is lower than the preset alarm value, the transmitter sends a message to remind the user to add water in time. When the user does not add water in time, the humidifier 100 continues to operate until the liquid level in the water storage tank reaches the preset end liquid level, and the humidifier stops working to ensure the safety of the humidifier.

In an embodiment, the liquid level sensing element includes sensing elements and a liquid level sensing circuit board. Sensing elements are arranged vertically, and the liquid level sensing circuit board is configured to process the signals generated by the sensing elements and convert the signals into liquid level values. Sensing elements may be arranged longitudinally on the sidewall of the water storage tank 6, for example, arranged longitudinally and evenly on the sidewall of the water storage tank. The sensing element can be a capacitive induction copper sheet, a pole piece or an electrode, etc. It is also possible to integrate the liquid level sensing circuit board on the circuit board of the humidifier, which is not limited in the present application.

In order to improve the user experience, as shown in FIG. 2, the humidifier 100 also includes an aromatherapy assembly 103, which is installed in the housing 1 and corresponds to the air outlet 12. In this way, the air discharged from the air outlet 12 has fragrance, to improve the user experience.

Since different users prefer different fragrances, the aromatherapy assembly 103 is detachably mounted on the housing 1, so that users can replace the aromatherapy assembly 103 with different fragrances according to their own needs, to improve user experience. The functions of the aromatherapy assembly 103 are various. For example, the aromatherapy assembly 103 may be an aromatherapy device with only air freshening effect, or an aromatherapy device with mosquito repelling effect, or an aromatherapy device with both air freshening effect and mosquito repelling effect, which is not limited in the present application.

Figure 6:
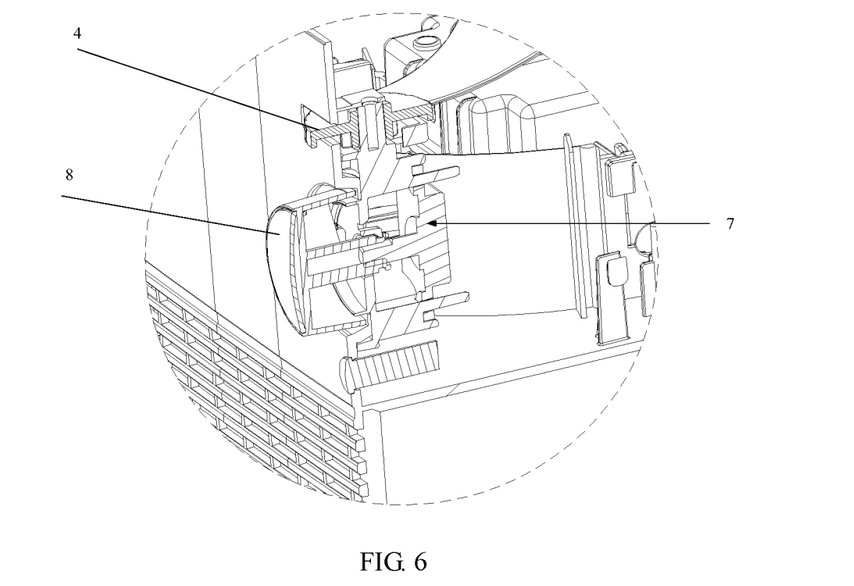
FIG. 6 is a schematic view of a partially enlarged structure at portion D in FIG. 5.

As shown in FIG. 6, the air outlet 12 is also provided with a guide blade 121. The guide blade 121 guides the air from the air outlet 12, so that the air discharged from the air outlet 12 can be discharged to the surroundings of the air outlet 12, which improves the humidification effect and prevents foreign objects from falling in.

As shown in FIG. 1, the air outlet 12 is provided with an installation portion 122 for the installation of the aromatherapy assembly 103. An installation gap is formed between the installation portion 122 and the inner wall surface of the air outlet 12, and the guide blade 121 is installed in the installation gap, which not only realizes the guidance of the air discharged from the air outlet 12, but also realizes the installation of the aromatherapy assembly 103, the structure is simple, and the aromatherapy effect is good.

Further, the guide blade 121 is arc-shaped, and the guide blade 121 is gradually inclined along its length direction to guide the air discharged from the air outlet 12. There are guide blades 121, and guide blades 121 are evenly distributed radially around the axis of the fan 2. One end of guide blades 121 is connected to the inner wall surface of the air outlet 12, the other end of air outlets 12 is connected to the installation portion 122. Not only is the humidified gas discharged from the air outlet 12 more uniform, but also the operation of the fan is more stable.

It should be noted that, in an embodiment of the present application, the guide blade 121, the aromatherapy assembly 103 and the water supply duct 15 are all integrated with the upper housing 1b, so that the structure is simplified, the number of parts is reduced, the installation is convenient, and the assembly efficiency of the humidifier is improved.

In order to achieve the above objective, the present application further provides a household appliance, including the above-mentioned humidifier 100. The specific structure of the humidifier 100 refers to the above-mentioned embodiments. Since the household appliance adopts all the above-mentioned embodiments, it at least has all the beneficial effects brought by all the above-mentioned embodiments, and will not be repeated herein.

The above are only some embodiments of the present application, and do not limit the scope of the present application thereto. Under the concept of the present application, equivalent structural transformations made according to the description and drawings of the present application, or direct/indirect application in other related technical fields are included in the scope of the present application.

What is claimed is:

1. A humidifier, comprising:
   a housing provided with an air inlet and an air outlet, wherein an air duct communicating with the air inlet and the air outlet, and a water storage tank communicating with the air duct are formed inside the housing;
   a fan provided in the air duct;
   a water absorption net assembly at least partially extending into the water storage tank and at least partially extending into the air duct; and
   a time record assembly installed in the housing and configured to record a use time of the water absorption net assembly;
   wherein the time record assembly comprises an identification portion and an indication portion, the identification portion is provided with a scale, and a relative position between the indication portion and the identification portion is adjustable, to make the indication portion correspond to different scales on the identification portion.

2. The humidifier of claim 1, wherein the identification portion is set as a dial, and the indication portion and the dial is adjustable relative to each other.

3. The humidifier of claim 2, wherein:
   the housing is provided with a first installation hole;
   a plurality of scales are provided on an outer peripheral side of the dial, the dial is rotatably installed in the housing, and the outer peripheral side of the dial corresponds to the first installation hole; and
   the identification portion is provided on an outer surface of the housing and corresponds to the first installation hole.

4. The humidifier of claim 3, wherein:
   the housing is further provided with a second installation hole adjacent to the first installation hole;
   the housing is further provided with an installation bracket, a first end of the installation bracket is installed to correspond to the first installation hole for the dial to be rotated and installed, a second end of the installation bracket is installed to correspond to the second installation hole;
   the humidifier further comprises a knob assembly, the knob assembly is installed at the second installation hole, and an end of the knob assembly is rotatably installed at the second end of the installation bracket.

5. The humidifier of claim 1, wherein:
   the housing are provided with a plurality of air inlets distributed along a circumference of the housing; and
   the air outlet is provided at a top of the housing.

6. The humidifier of claim 5, wherein:
the water storage tank is provided at a bottom of the housing;
the water absorption net assembly comprises a ring-shaped water absorption net, and the water absorption net assembly is provided inside the plurality of air inlets; and
the water storage tank is provided on a lower side of the water absorption net.

7. The humidifier of claim 5, wherein:
the air duct comprises an air outlet duct and an air inlet duct distributed up and down;
the plurality of air inlets correspond to a peripheral side of the air inlet duct; and
the fan is provided in the air outlet duct, and a rotation shaft of the fan extends vertically.

8. The humidifier of claim 1, wherein a water supply duct is provided inside the housing, a water inlet of the water supply duct is provided on a top of the housing, and a water outlet of the water supply duct is communicated with the water storage tank.

9. The humidifier of claim 8, wherein the water supply duct is provided at an end of the water inlet in a decreasing manner from top to bottom.

10. The humidifier of claim 1, further comprising:
an aromatherapy assembly installed on the housing and corresponding to the air outlet.

11. The humidifier of claim 1, wherein the air outlet is further provided with a guide blade.

12. A humidifier, comprising:
a housing provided with an air inlet and an air outlet, wherein an air duct communicating with the air inlet and the air outlet, and a water storage tank communicating with the air duct are formed inside the housing;
a fan provided in the air duct;
a water absorption net assembly at least partially extending into the water storage tank and at least partially extending into the air duct; and
a time record assembly installed in the housing and configured to record a use time of the water absorption net assembly;
wherein the housing comprises:
a lower housing, wherein the water storage tank is formed on the lower housing; and
an upper housing configured to cover an upper end of the lower housing;
wherein the fan is installed in the upper housing;
wherein a peripheral side of the upper housing is provided with a plurality of air inlets, a top of the upper housing is provided with the air outlet, the air duct is formed in the upper housing, a partition plate is provided in the air duct, the partition plate is configured to divide the air duct into an air inlet duct and an air outlet duct arranged up and down, an outlet is provided on the partition plate, the air inlet duct is communicated with the water storage tank, and the fan is installed on the partition plate.

13. The humidifier of claim 12, wherein an upper end of the water absorption net assembly is configured to abut against the partition plate.

14. A humidifier, comprising:
a housing provided with an air inlet and an air outlet, wherein an air duct communicating with the air inlet and the air outlet, and a water storage tank communicating with the air duct are formed inside the housing;
a fan provided in the air duct;
a water absorption net assembly at least partially extending into the water storage tank and at least partially extending into the air duct;
a time record assembly installed in the housing and configured to record a use time of the water absorption net assembly; and
a micro switch for controlling the fan to open or close;
wherein the micro switch is provided in the housing, a floating member is further provided in the water storage tank, and the floating member is movably installed in the water storage tank along up and down, so as to trigger the micro switch during its moving stroke.

15. The humidifier of claim 14, wherein:
the water storage tank is formed in an inner cavity at a lower end of the housing, a bottom of the water storage tank is provided with an installation seat communicating with the water storage tank, and an upper end of the installation seat is provided with an opening; and
the floating member comprises a floating ball and a jacking rod, the floating ball is provided in the installation seat, a first end of the jacking rod passes through the opening and is connected with the floating ball, and a second end of the jacking rod is configured to abut against the micro switch.

* * * * *